G. D. HAWORTH.

CORN-PLANTER.

No. 7,235. Reissued July 18, 1876.

Witnesses:

Alex Mahon

John G. Center.

Inventor:

George D. Haworth by A. M. Smith Atty.

UNITED STATES PATENT OFFICE.

GEORGE D. HAWORTH, OF DECATUR, ILLINOIS.

IMPROVEMENT IN CORN-PLANTERS.

Specification forming part of Letters Patent No. 134,747, dated January 14, 1873; reissue No. 7,235, dated July 18, 1876; application filed June 27, 1876.

DIVISION B.

*To all whom it may concern:*

Be it known that I, GEORGE D. HAWORTH, of Decatur, county of Macon and State of Illinois, have invented certain new and useful Improvements in Check-Row Cord for Corn-Planters, of which the following is a full, clear, and exact description, reference being had to the accompanying drawings, making part of this specification, in which—

Figure 1:
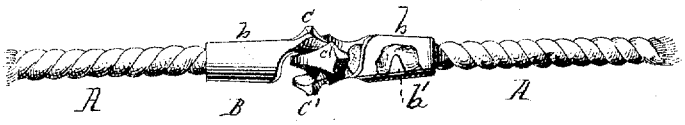
Figure 2:
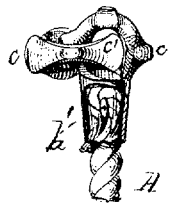
Figure 3:
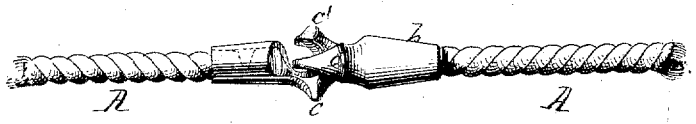

Figure 1 is a plan or side view of the ends of two sections or lengths of my improved check-row cord, showing the coupling-hooks. Fig. 2 shows the two hooks turned into position for connecting or disconnecting them, and Fig. 3 is a view similar to Fig. 1 with the parts reversed or inverted.

Similar letters of reference denote like parts in all the figures.

My invention consists in making a check-row cord designed for use upon a corn-planter for actuating the seeding mechanism in sections of cord provided at each end with an open hook, adapting it to be connected with a corresponding hook on the end of another section, said hooks having knobs or spurs formed upon them, which, when the two are united, shall constitute the knot or projection for actuating the seeding mechanism; also in certain details of construction of said coupling-hooks, adapting them to be readily and firmly united to the ends of the sections of cord, as hereinafter described.

In the accompanying drawing, A represents portions of the check-row cord or small rope employed as possessing the requisite pliability, adapting it to pass readily around the guiding-pulleys (shown in another division of this application) for transferring the cord from one side of the machine to the other in its passage over the same. B B are two of the hooks or coupling-pieces, made of metal, and provided each with a malleable shank, *b*, adapted to receive and firmly clasp the end of the cord or rope, as shown.

In the drawings, the shanks are shown as bent into the form of tubes or sleeves surrounding the end of the cord and broken away in places, Figs. 1 and 2, to show a pointed spur, *b'*, which penetrates the cord, or around which the end of the cord is looped, as shown, to prevent its accidental withdrawal, after the shank is bent into the sleeve form, grasping the cord. The spur is shown in dotted lines in Fig. 3. The shank, when bent into the cylindrical or sleeve form shown, is preferably made slightly tapering from the hook end, for the purpose of adapting it to readily enter the fork in the lever-arms which actuate the seeding devices, and also for giving increased bulk and strength of metal at the end united to the hook.

The open hook is made in the peculiar form represented — that is to say, expanded in width at or near its point of junction with the shank, and at or near its opposite or open end, where, also, it is provided with projecting knobs or points *c c'*, as shown, and flattened or reversely expanded between said points for securing the requisite strength of metal while adapting the hooks to readily turn one within the other, forming a universal-joint connection when united. Thus formed, the hooks can be united or separated only when brought into a certain angle of relation to each other, substantially that represented in Fig. 2, and consequently all danger of their becoming accidentally detached when in use is obviated, while at the same time the series of points or spurs *c c'* formed on the hooks, four in number, when two hooks are united, constitute an enlargement, knob, or knot upon the cord for actuating the forked levers of the corn-planter, and through said lever the seeding devices. The hooks turn within each other, and, being short, pass readily around the guiding or transferring pulleys referred to, thus preventing any undue strain or wear upon the cord at its point of junction with the shank or sleeve.

With a supply of the sections A, provided with the open coupling-hooks B, and made of uniform length, conforming to the distance apart of the rows of corn to be planted, the check-row cord can be readily lengthened or shortened to adapt it to the length or width of field to be operated upon, by simply adding or removing the sections, as required. The method of using a check-cord is well known, and need not be here described.

Having now described my invention, what I claim in this division of my application, and desire to secure by Letters Patent, is—

1. A check-row cord composed of short sections, provided with the open hooks B, having the projecting spurs or points *c c'*, arranged and operating substantially as and for the purpose described.

2. The open hooks B, provided with the open shanks *b*, adapted to be closed around and united to the ends of the cord, as described.

3. The hooks B, provided with the open shanks *b*, and retaining-spurs *b'*, substantially as and for the purpose set forth.

4. The combination, with the sections A of a check-row cord, of the open hooks B, provided with the spurs or knobs *c c'*, and shanks *b*, having the retaining-points *b*, substantially as and for the purpose set forth.

GEORGE D. HAWORTH.

Witnesses:
W. W. KERR,
BYRON PHELPS.